US012806865B2

(12) United States Patent
Brady et al.

(10) Patent No.: US 12,806,865 B2
(45) Date of Patent: Nov. 24, 2026

(54) SYSTEMS AND METHODS FOR DEMOLDING ADDITIVELY MANUFACTURED COMPONENTS

(71) Applicant: The Boeing Company, Arlington, VA (US)

(72) Inventors: Steven K. Brady, Renton, WA (US); Kenneth W. Young, Bear, DE (US); Sean Cossano, Seattle, WA (US)

(73) Assignee: The Boeing Company, Arlington, VA (US)

( * ) Notice: Subject to any disclaimer, the term of this patent is extended or adjusted under 35 U.S.C. 154(b) by 358 days.

(21) Appl. No.: 18/509,527

(22) Filed: Nov. 15, 2023

(65) Prior Publication Data

US 2024/0286197 A1    Aug. 29, 2024

Related U.S. Application Data

(60) Provisional application No. 63/486,730, filed on Feb. 24, 2023.

(51) Int. Cl.
*B05B 7/20* (2006.01)
*B05B 7/14* (2006.01)
(Continued)

(52) U.S. Cl.
CPC ............ *B29C 64/40* (2017.08); *B05B 7/1486* (2013.01); *B05B 7/203* (2013.01); *B05B 7/205* (2013.01); *B22F 10/28* (2021.01); *B22F 10/66* (2021.01); *B29C 64/153* (2017.08); *B29C 64/165* (2017.08); *B29C 64/188* (2017.08);
(Continued)

(58) Field of Classification Search
CPC ......... B05B 7/1486; B05B 7/20; B05B 7/203; B05B 7/205; B05D 1/08; B05D 1/12; B22F 10/22; B22F 10/25; B22F 10/28; B22F 10/60; B22F 10/66; B22F 12/30; B22F 12/53; B22F 12/82; B29C 33/44; B29C 64/10; B29C 64/153; B29C 64/165;
(Continued)

(56) References Cited

U.S. PATENT DOCUMENTS 7,507,312 B2 3/2009 Bossi et al.
7,604,768 B2 10/2009 Kritchman
(Continued)

FOREIGN PATENT DOCUMENTS

WO WO 2008/010270 1/2008

OTHER PUBLICATIONS

European Patent Office, Extended European Search Report, App. No. 24152703.5 (Jun. 14, 2024).
(Continued)

*Primary Examiner* — Leo B Tentoni
(74) *Attorney, Agent, or Firm* — Walters & Wasylyna LLC

(57) ABSTRACT

A system and method for demolding an additively manufactured component includes generating a shockwave in at least one of the additively manufactured component and the substrate upon which the additively manufactured component is built and applying a tensile stress at an interface between the additively manufactured component and the substrate to separate at least a portion of the additively manufactured component from the substrate along the interface in response to the tensile stress.

20 Claims, 10 Drawing Sheets

(51) Int. Cl.

| | |
|---|---|
| ***B05D 1/08*** | (2006.01) |
| ***B05D 1/12*** | (2006.01) |
| ***B22F 10/22*** | (2021.01) |
| ***B22F 10/25*** | (2021.01) |
| ***B22F 10/28*** | (2021.01) |
| ***B22F 10/60*** | (2021.01) |
| ***B22F 10/66*** | (2021.01) |
| ***B22F 12/30*** | (2021.01) |
| ***B22F 12/53*** | (2021.01) |
| ***B22F 12/82*** | (2021.01) |
| ***B29C 33/44*** | (2006.01) |
| ***B29C 64/10*** | (2017.01) |
| ***B29C 64/153*** | (2017.01) |
| ***B29C 64/165*** | (2017.01) |
| ***B29C 64/188*** | (2017.01) |
| ***B29C 64/209*** | (2017.01) |
| ***B29C 64/245*** | (2017.01) |
| ***B29C 64/30*** | (2017.01) |
| ***B29C 64/35*** | (2017.01) |
| ***B29C 64/40*** | (2017.01) |
| ***B33Y 10/00*** | (2015.01) |
| ***B33Y 30/00*** | (2015.01) |
| ***B33Y 40/00*** | (2020.01) |
| ***B33Y 40/20*** | (2020.01) |
| *B22F 10/40* | (2021.01) |

(52) U.S. Cl.

CPC ............ *B29C 64/245* (2017.08); *B29C 64/35* (2017.08); *B33Y 10/00* (2014.12); *B33Y 30/00* (2014.12); *B33Y 40/00* (2014.12); *B33Y 40/20* (2020.01); *B22F 10/40* (2021.01); *B22F 2998/10* (2013.01); *B22F 2999/00* (2013.01); *Y02P 10/25* (2015.11)

(58) Field of Classification Search

CPC ..... B29C 64/209; B29C 64/245; B29C 64/30; B33Y 10/00; B33Y 30/00; B33Y 40/00

USPC .......... 264/113, 308, 334, 442, 497; 425/78, 425/174.2, 174.4, 375, 436 RM; 427/448, 427/510; 118/57, 308, 620; 219/121.12, 219/121.35, 121.6, 121.65, 121.66, 219/121.85

See application file for complete search history.

(56) References Cited

U.S. PATENT DOCUMENTS

| | | | | |
|---|---|---|---|---|
| 8,714,016 | B2 | 5/2014 | Stewart et al. | |
| 10,641,742 | B2 | 5/2020 | Clemen, Jr. et al. | |
| 2006/0054039 | A1* | 3/2006 | Kritchman ............. | B33Y 10/00 427/256 |
| 2007/0126157 | A1* | 6/2007 | Bredt ..................... | B33Y 10/00 425/375 |
| 2014/0065343 | A1* | 3/2014 | Hess ..................... | B29C 64/153 118/620 X |
| 2015/0128709 | A1* | 5/2015 | Stewart .................. | G01N 29/14 73/588 |
| 2016/0271870 | A1 | 9/2016 | Brown, Jr. | |
| 2019/0039367 | A1 | 2/2019 | Roman et al. | |

OTHER PUBLICATIONS

Jeff Sloan: "Laser Bondline Inspection Becomes Reality," *Composites World,* (Feb. 8, 2022).

European Patent Office: "Communication pursuant to Article 94(3) EPC," App. No. 24 152 703.5 (Sep. 10, 2026).

* cited by examiner

SYSTEMS AND METHODS FOR DEMOLDING ADDITIVELY MANUFACTURED COMPONENTS

PRIORITY

This application claims priority from U.S. Ser. No. 63/486,730 filed on Feb. 24, 2023, the entire contents of which are incorporated herein by reference.

FIELD

The present disclosure relates generally to additive manufacturing and, more particularly, to systems and methods for demolding an additively manufactured component from a support substrate.

BACKGROUND

Additive manufacturing has become an attractive solution for manufacturing a wide variety of objects. In contrast to conventional subtractive manufacturing, additive manufacturing enables fast, flexible, and cost-efficient production of three-dimensional objects in near net shape. Additive manufacturing fabricates a solid, often geometrically complex, object from a series of layers, in which each subsequent layer is built upon a previous layer. In most cases, an initial layer of the object is built on a build platform. Upon completion of the additive manufacturing process, a portion of the object is bound to the build platform and must be separated from the build platform. As examples, the separating process includes one or more of prying, chiseling, and/or cutting the additively manufactured object from the build platform. However, such operations can apply undesired forces that can deform or damage the object. Other examples of the separating process include cutting or machining the build platform off of the additively manufactured object. However, such operations can damage and, thus, prevent re-use of the build platform. Accordingly, those skilled in the art continue with research and development efforts in the field of additive manufacturing.

SUMMARY

Disclosed are examples of a method for demolding an additively manufactured component, a method for making an additively manufactured component, and a system for demolding an additively manufactured component. The following is a non-exhaustive list of examples, which may or may not be claimed, of the subject matter according to the present disclosure.

In an example, the disclosed method includes steps of: (1) generating a shockwave in at least one of an additively manufactured component or a substrate upon which the additively manufactured component is built; and (2) applying a tensile stress at an interface between the additively manufactured component and the substrate to separate at least a portion of the additively manufactured component from the substrate along the interface in response to the tensile stress.

In an example, the disclosed method includes steps of: (1) building an additively manufactured component layer-by-layer on a substrate; (2) generating a shockwave in at least one of the additively manufactured component or the substrate; and (3) applying a tensile stress at an interface between the additively manufactured component and the substrate to separate at least a portion of the additively manufactured component from the substrate along the interface in response to the tensile stress.

In an example, the disclosed system includes a substrate upon which an additively manufactured component is built. The system also includes a shockwave generator. The shockwave generator is configured to generate a shockwave in at least one of the additively manufactured component and the substrate that results in a tensile stress at an interface between the additively manufactured component and the substrate. At least a portion of the additively manufactured component separates from the substrate along the interface in response to the tensile stress.

Other examples of the methods and the system disclosed herein will become apparent from the following detailed description, the accompanying drawings, and the appended claims.

DETAILED DESCRIPTION

The present disclosure recognizes that additively manufactured components are typically built on some type of build platform. The build platform generally provides a surface to which the component sticks during building. For example, an initially formed base layer of the additively manufactured component is built on the build platform and subsequent layers are built on previous layers. This building process results in the additively manufactured component being coupled, or bonded, to a surface of the build platform.

Another example includes use and removal of a support structure. The support structure enables building of additively manufactured component of certain extended geometries (e.g., overhangs, holes, edges, etc.) that otherwise would not stand or remain stable in a free state. As examples, the support structure assists in the build, minimizes distortion during the build, and/or holds up a portion of the additively manufactured component that otherwise has no underlaying supporting material during the build. Removal of these support structures without machining provides particular advantages, especially if internal access to an interface between the additively manufactured component and the support structure is blocked to conventional removal methods.

The present disclosure is directed to systems and methods for demolding additively manufactured components from the build platform using shockwaves that are transmitted through an interface between the component and the build platform and/or between the additively manufactured component and one or more support structures. Shockwave demolding can be very precisely targeted and can neatly separate the additively manufactured component from the build platform and/or the support structure at one or more locations with little or no distortion or damage to the additively manufactured component.

For the purpose of the present disclosure, the term demolding refers to breaking of a bond between an additively manufactured component and an underlying support substrate upon which the additively manufactured component was built and, thereby, separating the additively manufactured component from the underlying support substrate.

Referring generally to FIGS. 1 and 3-13, by way of examples, the present disclosure is directed to a method 1000. The method 1000 facilitates demolding of an additively manufactured component 102 from a substrate 104.

Figure 1:
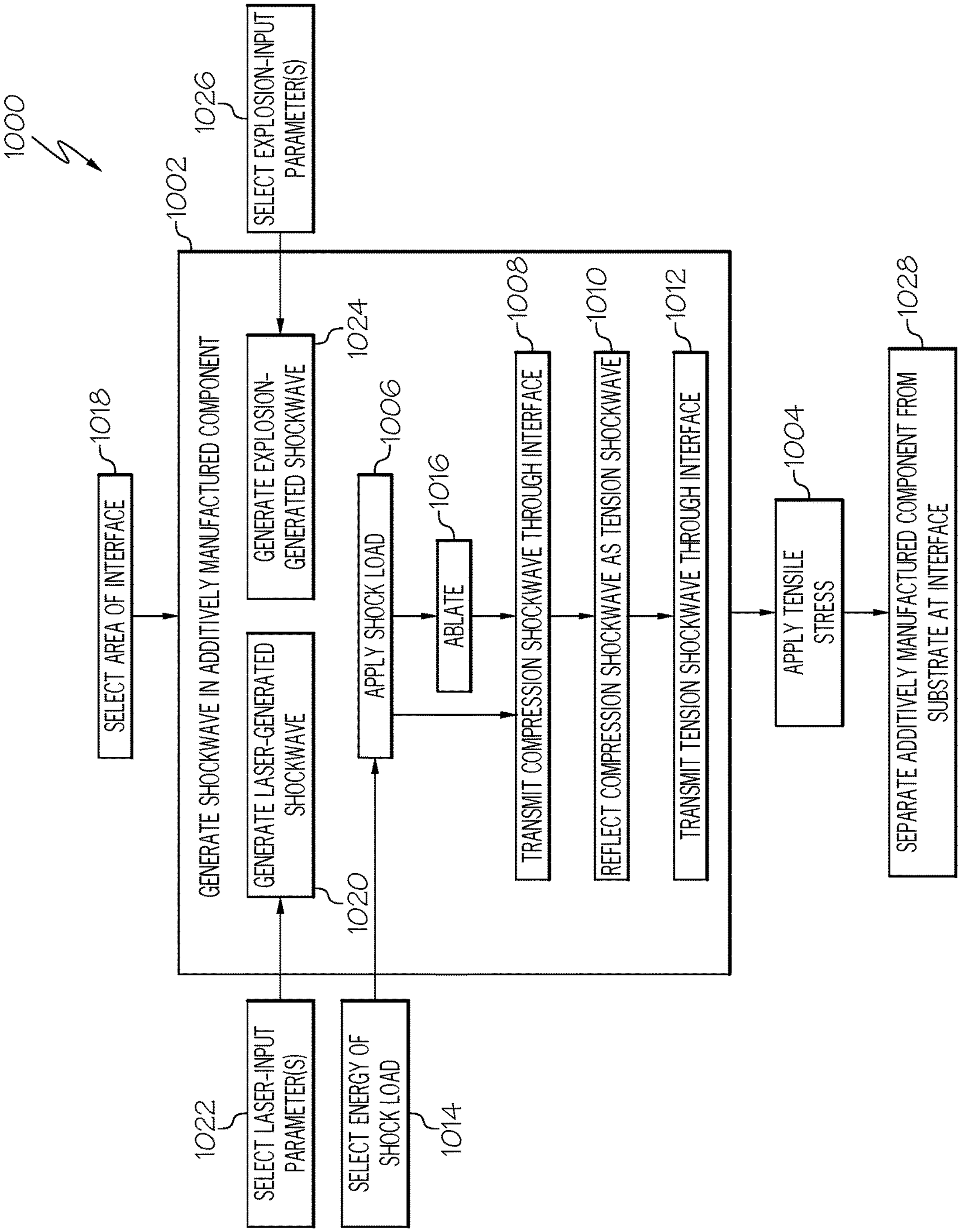
FIG. 1 is a flow diagram of an example of a method for demolding an additively manufactured component.
Figure 3:
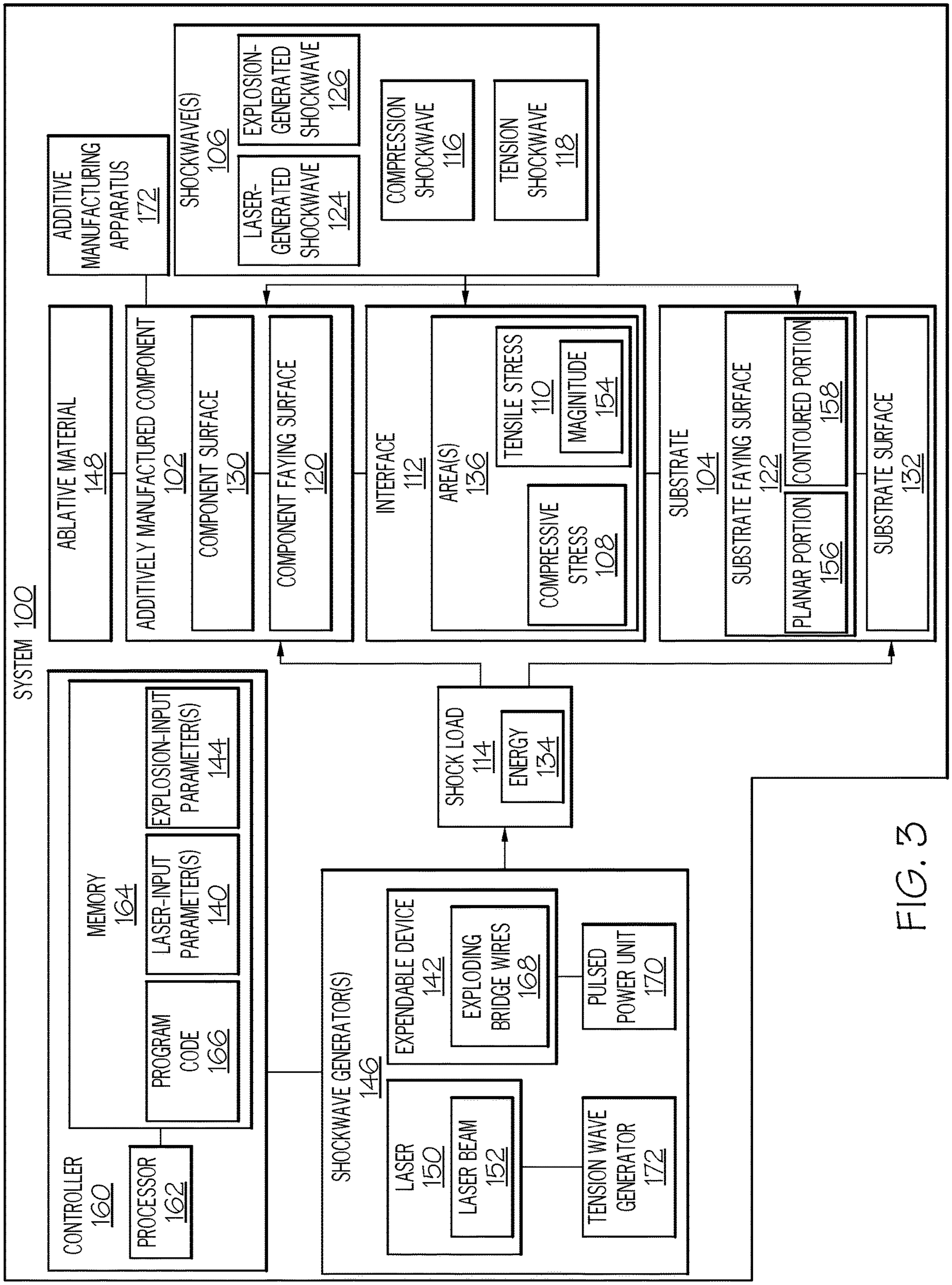
FIG. 3 is a schematic block diagram of an example of a system for demolding the additively manufactured component.

Referring to FIGS. 1 and 3, in one or more examples, the method 1000 includes a step of (block 1002) generating a shockwave 106. The shockwave 106 can be generated in at least one of the additively manufactured component 102 and/or the substrate 104 upon which the additively manufactured component 102 is build. The method 1000 includes a step of (block 1004) applying a tensile stress 110 at an interface 112 between the additively manufactured component 102 and the substrate 104 to separate at least a portion of the additively manufactured component 102 from the substrate 104 along the interface 112 in response to the tensile stress 110.

In other words, the shockwave 106 in the additively manufactured component 102 and/or the substrate 104 results in the tensile stress 110 at the interface 112 between the additively manufactured component 102 and the substrate 104. In one or more examples, the method 1000 also includes, or concludes in, a step of (block 1028) separating at least a portion of the additively manufactured component 102 from the substrate 104 along the interface 112 in response to the tensile stress 110.

In one or more examples, generating the demold or disbond at or along a portion of the interface 112 serves as an initiation point to further progress separation of the additively manufactured component 102 from the substrate 104. Additionally, in one or more examples, complex geometries may have regions that can stall separation (e.g., demolding or disbonding) due to load path or feature lock. In these examples, generating new demold or disbond site locations works to progress the demolding to enable final separation of the additively manufactured component 102 from the substrate 104.

Generally, the additively manufactured component 102 refers to or includes any one of various types of objects, articles, parts, structures, and the like that is made using any suitable additive manufacturing technique or process. The additively manufactured component 102 can be made of any suitable material or combination of materials, such as, but not limited to, metallic materials, polymeric (e.g., plastic) materials, ceramic materials, and the like. The additively manufactured component 102 can have any suitable dimensions or three-dimensional shape.

In one or more examples, the additively manufactured component 102 is built upon the substrate 104. The substrate 104 refers to or includes any suitable structure that provides a surface upon which at least a portion of the additively manufactured component 102 is built. In one or more examples, the substrate 104 includes or may be referred to as a base plate, a build platform, or other terms common in the art. In other examples, the substrate 104 includes or may be referred to as a support structure or other terms common in the art. As will be described by examples herein, the substrate 104 can have any suitable dimensions. The substrate 104 can be made of any suitable material, for example, based on a material composition of the additively manufactured component 102.

The interface 112 refers to an area where the additively manufactured component 102 and the substrate 104 meet and interact with each other. Generally, the additively manufactured component 102 can be interpreted as being bonded to the substrate 104 at or along the interface 112. The bond between the additively manufactured component 102 and the substrate 104 is a result of the heating, melting, cooling, and solidifying process typical of additive manufacturing.

According to the present disclosure, the additively manufactured component 102 is demolded (e.g., debonded or separated) from the substrate 104 at or along the interface 112 using shockwaves (e.g., the shockwave 106) that are transmitted across the interface 112. The disclosed shockwave demolding method provides distinct advantages over conventional cutting, chiseling, and prying techniques and provides accurate and precise separation of the additively manufactured component 102 from the substrate 104 without damaging or otherwise altering the additively manufactured component 102.

More particularly, and according to the present disclosure, the additively manufactured component 102 is demolded from the substrate 104 at or along the interface 112 using tensile stress (e.g., the tensile stress 110) that results from shockwaves (e.g., the shockwave 106) transmitted across the interface 112. The tensile stress 110 is a force that acts along an axis of force, which intersects a plane of the interface 112, and that tends to place the interface 112 under tension or that results in stretching of the interface 112 along the axis of force. Generally, the tensile stress 110 is an external force per unit area.

Referring to FIGS. 1, 3, 4A and 4B, in one or more examples, at least a portion of the substrate 104 is planar. As an example, at least a portion of a build surface of the substrate 104 is planar. In these examples, at least a portion of the additively manufactured component 102 is built on a planar portion 156 of the substrate 104, such as the planar portion 156 of the build surface of the substrate 104. Generally, the build surface of the substrate 104 is a surface of the substrate 104 upon which the additively manufactured component 102 is built on and bonded to.

Figure 8:
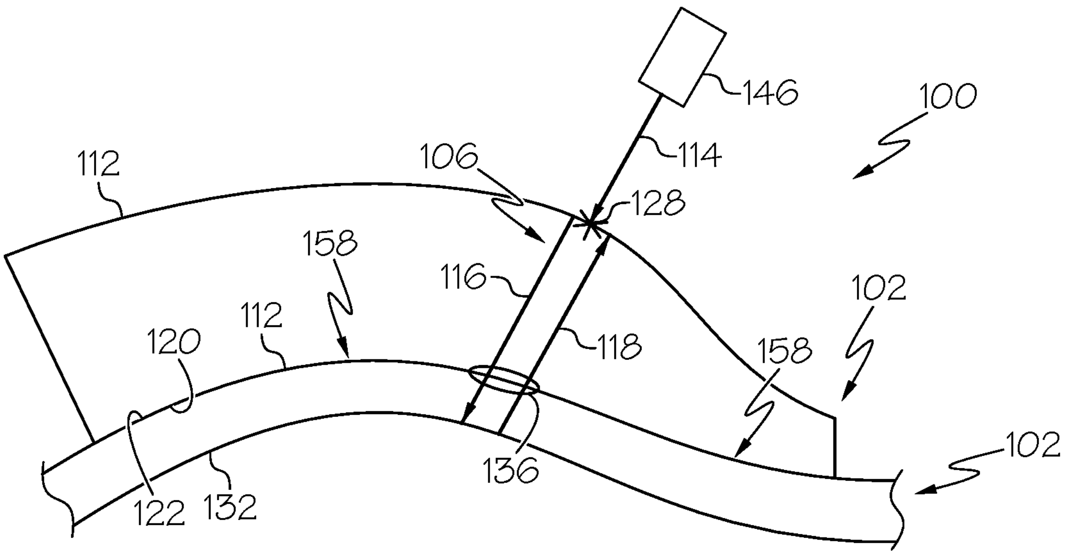
FIG. 8 is a schematic illustration of an example of a portion of the system illustrated in FIG. 3, depicting the additively manufactured component and the substrate relative to an applied shock load.

Referring to FIGS. 1, 3 and 8, in one or more examples, the substrate 104 includes a contour. As an example, at least a portion of the build surface of the substrate 104 is contoured or includes a curvature along at least one axis. In these examples, at least a portion of the additively manufactured component 102 is built on a contoured portion 158 of the substrate 104, such as the contoured portion 158 of the build surface of the substrate 104.

Referring to FIGS. 1, 3-9, in one or more examples, according to the method 1000, the step of (block 1002) generating the shockwave 106 includes a step of (block 1006) applying a shock load 114 to at least one of the additively manufactured component 102 and/or the substrate 104. The step of (block 1002) generating the shockwave 106 includes a step of (block 1008) transmitting a compression shockwave 116 through the interface 112 between the additively manufactured component 102 and the substrate 104. The step of (block 1002) generating the shockwave 106 includes a step of (block 1010) reflecting the compression shockwave 116 as a tension shockwave 118. The step of (block 1002) generating the shockwave 106 includes a step of (block 1012) transmitting the tension shockwave 118 through the interface 112 between the additively manufactured component 102 and the substrate 104. In these examples, the tensile stress 110 is generated and applied in response to the tension shockwave 118. In these examples, according to the method 1000, a portion of the additively manufactured component 102 is separated (e.g., demolded) from the substrate 104 along a portion of the interface 112 in response to the tension shockwave 118.

Figure 4A:
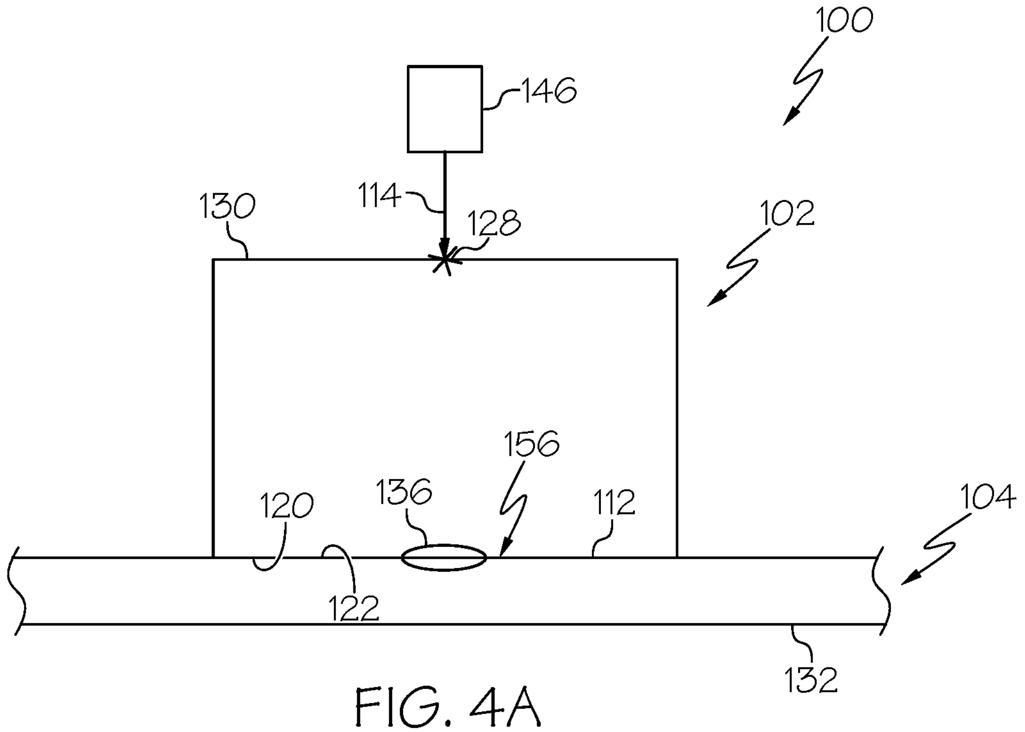
FIG. 4A is a schematic illustration of an example of a portion of the system illustrated in FIG. 3, depicting the additively manufactured component and a substrate relative to an applied shock load.
Figure 4B:
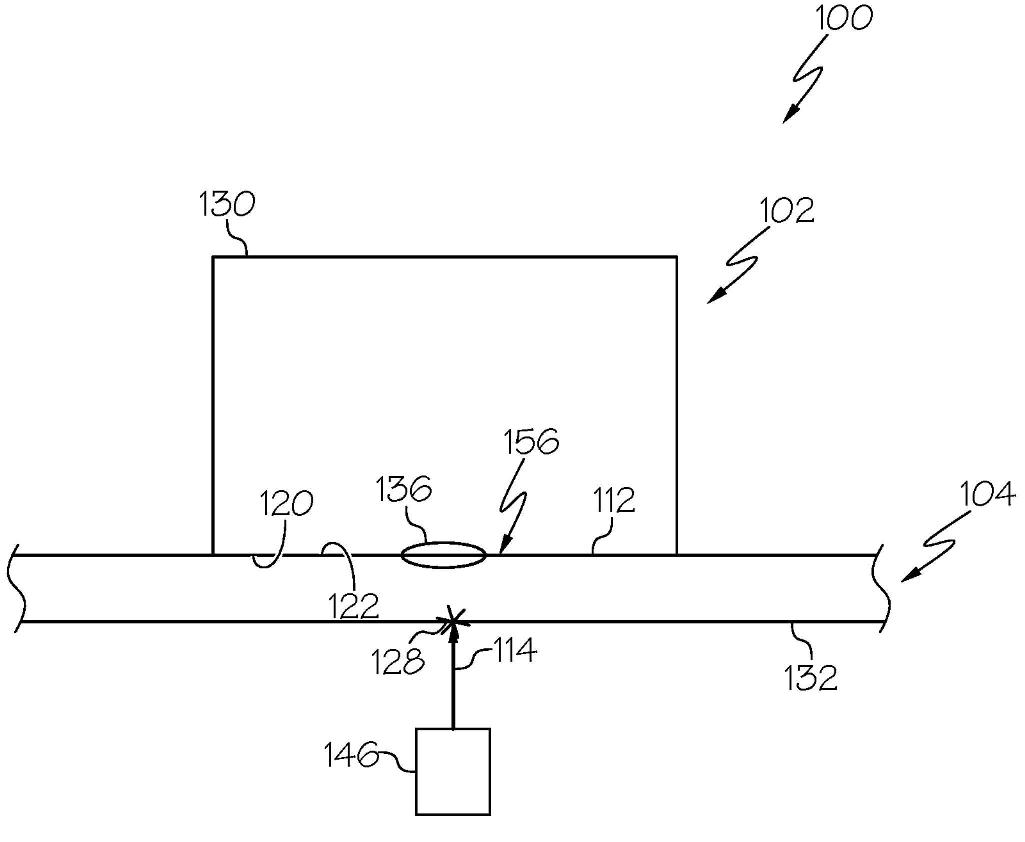
FIG. 4B is a schematic illustration of an example of a portion of the system illustrated in FIG. 3, depicting the additively manufactured component and the substrate relative to an applied shock load.

In the example illustrated in FIG. 4A, the shock load 114 is applied to the additively manufactured component 102. In the example illustrated in FIG. 4B, the shock load 114 is applied to the substrate 104. In the example illustrated in FIG. 9, a first instance of the shock load 114 (e.g., a first shock load 114*a*) is applied to the additively manufactured component 102 and a second instance of the shock load 114 (e.g., a second shock load 114*b*) is applied to the substrate 104. In these examples, the instances of the shock load 114 (e.g., first shock load 114*a* and second shock load 114*b*) are applied to the additively manufactured component 102 and the substrate 104 approximately concurrently. Applying opposing instances of the shock load 114 approximately simultaneously to the additively manufactured component 102 and to the substrate 104 can advantageously be used to achieve a stronger instance of the tension shockwave 118 and, thus, a higher magnitude of the tensile stress 110 at the interface 112 through superposition.

In yet other examples, a plurality of first instances of the shock load 114 (e.g., a plurality of first shock loads) is applied to the additively manufactured component 102 and a plurality of second instances of the shock load 114 (e.g., a plurality of second shock loads) is applied to the substrate 104. In these examples, instances of the shock load 114 can be applied to the additively manufactured component 102 and the substrate 104 approximately concurrently or consecutively. Applying opposing instances of the shock load 114 to the additively manufactured component 102 and to the substrate 104 can advantageously be used to decrease demolding cycle time.

Referring to FIGS. 1 and 3, in one or more examples, the method 1000 includes a step of (block 1014) selecting an energy 134 of the shock load 114 to produce a magnitude 154 of the tensile stress 110 sufficient to separate the additively manufactured component 102 from the substrate 104 at the interface 112. The magnitude 154 of the tensile stress 110 and, thus, the energy 134 of the shock load 114 required to demold the additively manufactured component 102 from the substrate 104 depends on various factors, such as, but not limited to, a material composition of the additively manufactured component 102 and/or the substrate 104, the degree of adhesion bonding between the additively manufactured component 102 and the substrate 104, the shockwave impedance of the additively manufactured component 102 and/or the substrate 104, and the like. Generally, an increase in the energy 134 will lead to an increase in the magnitude 154 of the tensile stress 110 applied across the interface 112.

Referring to FIGS. 1, 3, 4A, 4B and 8, in one or more examples, according to the method 1000, the step of (block 1006) applying the shock load 114 includes a step of applying the shock load 114 at a selected location 128 on at least one of a component surface 130 of the additively manufactured component 102 and/or a substrate surface 132 of the substrate 104. In one or more examples, the selected location 128 corresponds to or is aligned with an area 136 of the interface 112 that is desired or selected for separation. In the examples illustrated in FIGS. 4A and 8, the shock load 114 is applied at the selected location 128 on the component surface 130 of the additively manufactured component 102. In the example illustrated in FIG. 4B, the shock load 114 is applied at the selected location 128 on the substrate surface 132 of the substrate 104. In the example illustrated in FIG. 9, a first instance of the shock load 114 (e.g., the first shock load 114*a*) is applied to a first selected location 128*a* on the component surface 130 of the additively manufactured component 102 and a second instance of the shock load 114 (e.g., the second shock load 114*b*) is applied to a second selected location 128*b* on the substrate surface 132 of the substrate 104. In one or more examples, the first selected location 128*a* and the second selected location 128*b* are at least approximately aligned with or opposed to each other such that a first shockwave 106*a* and a second shockwave 106*b* pass through at least approximately the same instance of the area 136.

Referring to FIGS. 1, 3, 4A, 4B and 8, in one or more examples, the method 1000 includes a step of (block 1018) selecting the area 136 of the interface 112 at which to separate the additively manufactured component 102 from the substrate 104. In these examples, the selected location 128 corresponds to or is aligned with the area 136. The tension shockwave 118 passes through the area 136. As such, the tensile stress 110, resulting from the tension shockwave 118, is applied to the area 136 of the interface 112.

As illustrated in FIGS. 4A, 4B and 5-9, generally, the tension shockwave 118 is transmitted through the additively manufactured component 102 and the substrate 104, thereby passing through the interface 112, applying the tensile stress 110 to the area 136, and demolding the additively manufactured component 102 from the substrate 104 at the interface 112. In one or more examples, the tension shockwave 118 is at least approximately perpendicular to the interface 112. In one or more examples, the tension shockwave 118 is non-perpendicular to the interface 112. In one or more examples, the shock load 114 is applied or delivered in a direction that is approximately normal to the component surface 130 or the substrate surface 132. In other examples, the shock load 114 can be applied or delivered in various other directions. In one or more examples, an intersection angle at which the tension shockwave 118 passes through the interface 112 depends on various parameters, such as, but not limited to, an incidence angle of the shock load 114 relative to the component surface 130 of the additively manufactured component 102 and/or the substrate surface 132 of the substrate 104, the surface curvature (e.g., planar or contoured) of the component surface 130 of the additively manufactured component 102 and/or the substrate surface 132 of the substrate 104, the curvature (e.g., planar or contoured) of the interface 112, the material composition of the additively manufactured component 102 and/or the substrate 104, the geometry of the additively manufactured component 102 and/or the substrate 104, the depth or distance of the interface 112 from the shock surface, and the like.

Figure 10:
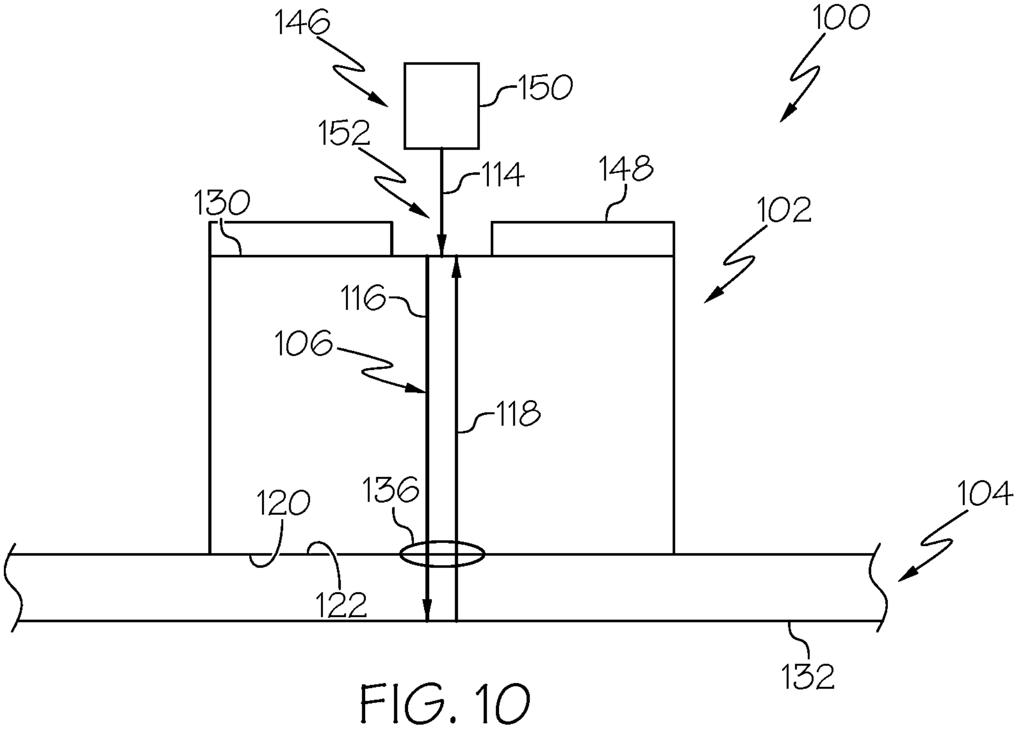
FIG. 10 is a schematic illustration of an example of a portion of the system illustrated in FIG. 3, depicting the additively manufactured component and the substrate relative to an applied shock load.

Referring to FIGS. 1, 3 and 10, in one or more examples, the method 1000 includes a step of (block 1016) ablating. In one or more examples, the step of ablating (block 1016) includes a step of ablating a portion of the component surface 130 while applying the shock load 114. In one or more examples, the step of (block 1016) ablating includes a step of ablating an ablative material 148 located on portion of the component surface 130 while applying the shock load 114. As will be described by examples herein, the step of (block 1016) ablating occurs when the shockwave 106 is a laser-generated shockwave 124.

Figure 11:
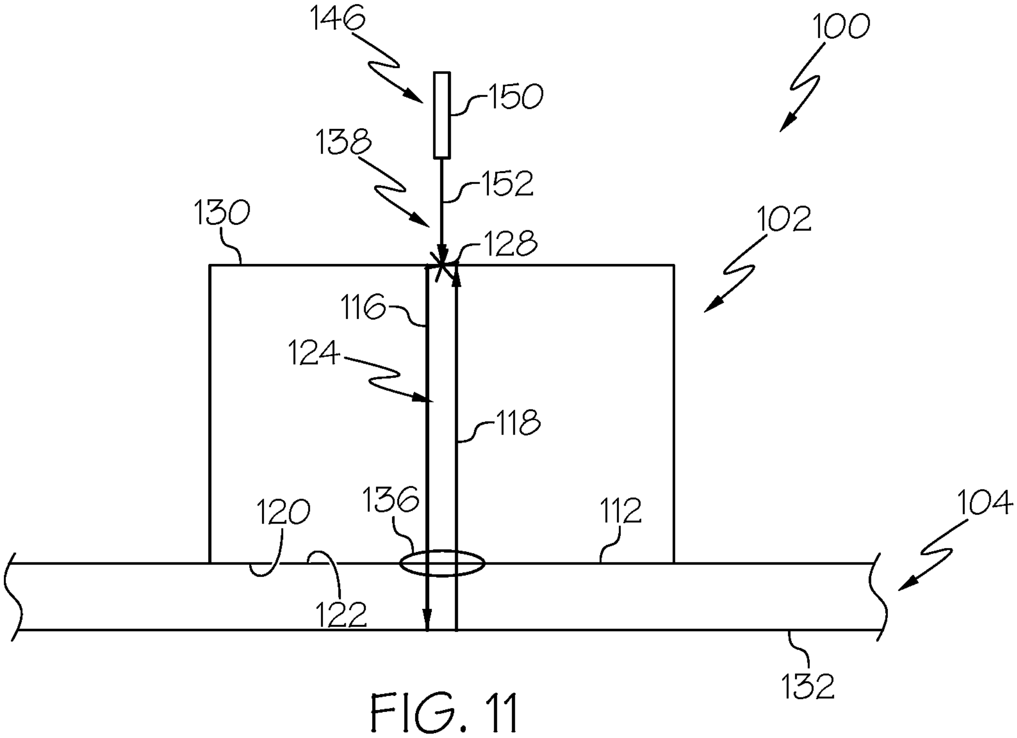
FIG. 11 is a schematic illustration of an example of a portion of the system illustrated in FIG. 3.

Referring to FIGS. 1, 3 and 11, in one or more examples, the shockwave 106 includes the laser-generated shockwave 124. In these examples, the step of (block 1002) generating the shockwave 106 includes a step of (block 1020) generating the laser-generated shockwave 124.

Referring to FIGS. 1, 3 and 11, in one or more examples, according to the method 1000, the step of (block 1002) generating the shockwave 106, such as the step of (block 1020) generating the laser-generated shockwave 124, includes a step of applying a laser pulse 138 (e.g., a short pulse of a laser beam 152) to the selected location 128 on at least one of the component surface 130 of the additively manufactured component 102 and/or the substrate surface 132 of the substrate 104.

Referring to FIGS. 1 and 3, in one or more examples, the method 1000 includes a step of (block 1022) selecting at least one laser-input parameter 140 for the laser pulse 138 to produce the magnitude 154 of the tensile stress 110 sufficient to separate the additively manufactured component 102 from the substrate 104 at the area 136 of the interface 112.

Examples of the laser-input parameter 140 include spot size (e.g., dimension of the laser beam 152), laser pulse width (e.g., duration), wavelength, energy, and the like. Examples of the laser-input parameters 140 that have yielded successful demolding of additively manufactured components from support substrates include a spot size of approximately 1 centimeter (cm), a pulse width of approximately 200 nanoseconds, a wavelength of approximately 1,053 nanometers (nm), and energies ranging from approximately 4 Joules (J) to approximately 45 J. However, other values and/or examples of the laser-input parameters 140 are also contemplated.

Figure 12:
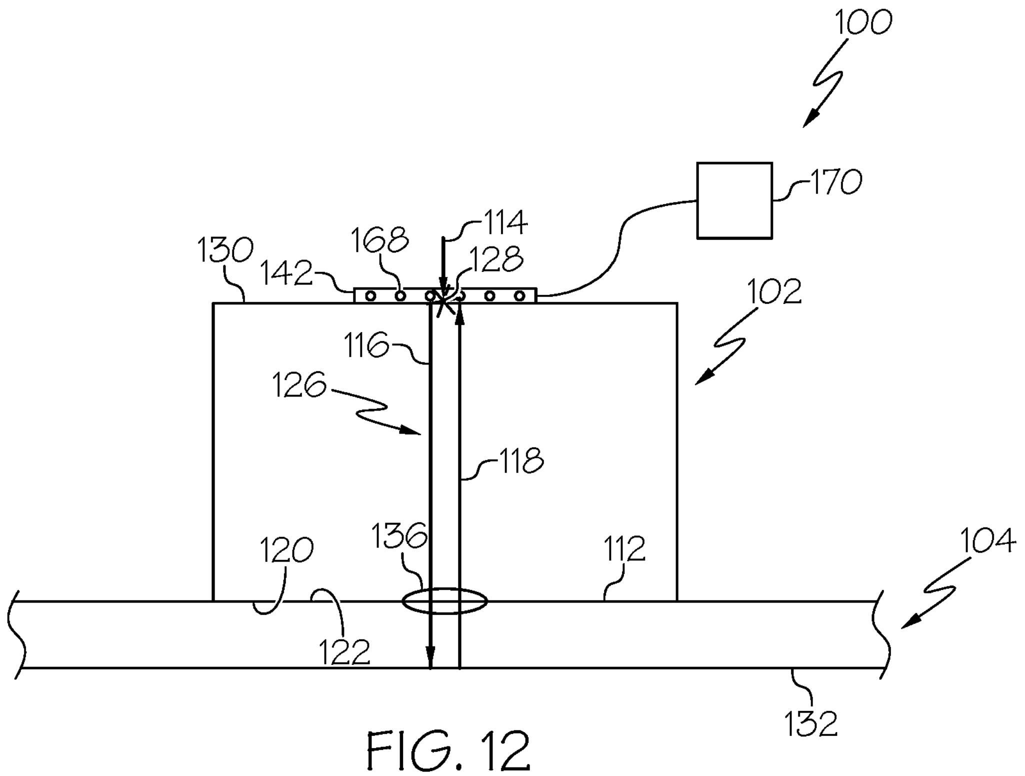
FIG. 12 is a schematic illustration of an example of a portion of the system illustrated in FIG. 3.

Referring to FIGS. 1, 3 and 12, in one or more examples, the shockwave 106 includes an explosion-generated shockwave 126. In these examples, the step of (block 1002) generating the shockwave 106 includes a step of (block 1024) generating the explosion-generated shockwave 126.

Referring to FIGS. 1, 3 and 12, in one or more examples, according to the method 1000, the step of (block 1002) generating the shockwave 106, such as the step of (block 1024) generating the explosion-generated shockwave 126, includes a step of coupling an expendable device 142 to the selected location 128 on at least one of the component surface 130 of the additively manufactured component 102 and/or the substrate surface 132 of the substrate 104, and a step of vaporizing a portion of the expendable device 142.

Referring to FIGS. 1 and 3, in one or more examples, the method 1000 includes a step of (block 1026) selecting at least one explosion-input parameter 144 for the expendable device 142 to produce the magnitude 154 of the tensile stress 110 sufficient to separate the additively manufactured component 102 from the substrate 104 at the area 136 of the interface 112.

Examples of the explosion-input parameter 144 include cross-sectional area of the vaporizing portion of the expendable device, energy, and the like. Examples of the explosion-input parameters 144 that have yielded successful demolding of additively manufactured components from support substrates include cross-sectional areas ranging from approximately 0.2 square millimeters ($mm^2$) to approximately 0.005 $mm^2$ and energies ranging from approximately 10 Joules (J) to approximately 500 J. However, other values and/or examples of the laser-input parameters 140 are also contemplated.

Figure 9:
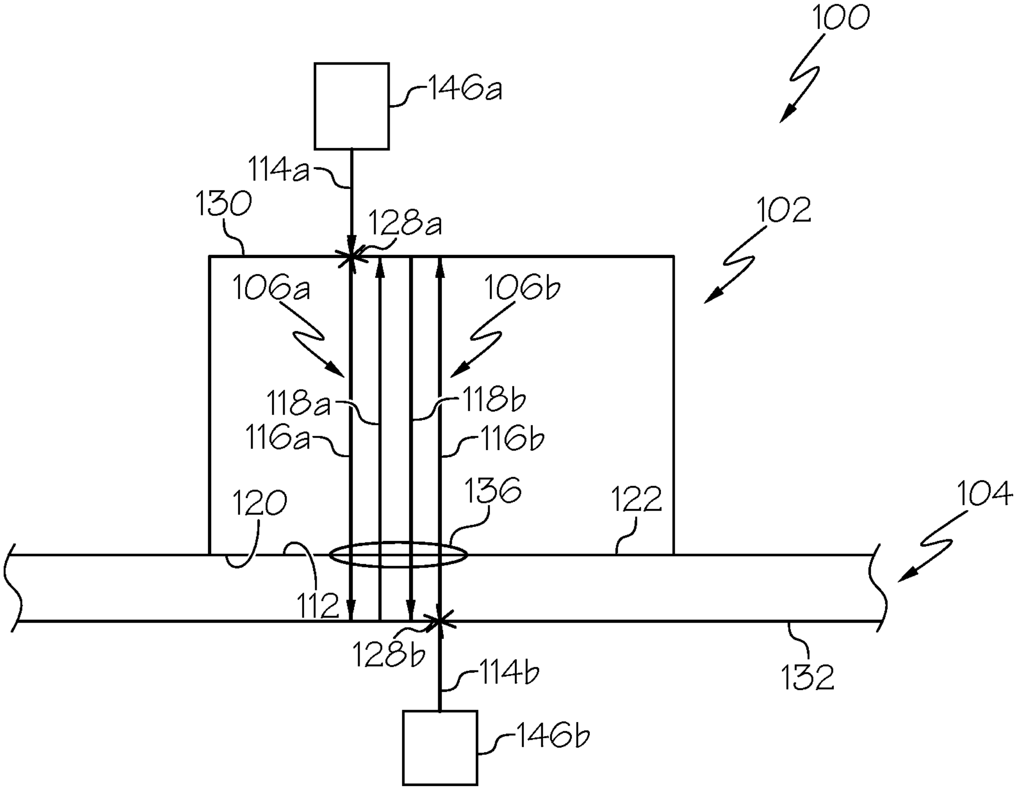
FIG. 9 is a schematic illustration of an example of a portion of the system illustrated in FIG. 3, depicting the additively manufactured component and the substrate relative to a plurality of applied shock loads.

Referring to FIGS. 1, 3 and 9, in one or more examples, the method 1000 includes a step of generating a plurality of shockwaves 106 (e.g., at least the first shockwave **106*a* and the second shockwave 106*b*) in the additively manufactured component 102 that results in the tensile stress 110 at the areas 136 along the interface 112 between the additively manufactured component 102 and the substrate 104. In other examples, the method 1000 includes a step of generating the plurality of shockwaves 106 (e.g., at least the first shockwave 106*a* and the second shockwave 106*b*) in the additively manufactured component 102 that results in the tensile stress 110 at a plurality of different instances of the area 136 along the interface 112 between the additively manufactured component 102 and the substrate 104. The method 1000 also includes a step of separating the additively manufactured component 102 from the substrate 104 at the plurality of areas 136 along the interface 112**.

Referring generally to FIGS. 2-13, by way of examples, the present disclosure is directed to a method 2000. The method 2000 facilities making the additively manufactured component 102 and demolding of the additively manufactured component 102 from the substrate 104. In one or more examples, the method 1000 forms a portion of the method 2000.

Figure 2:
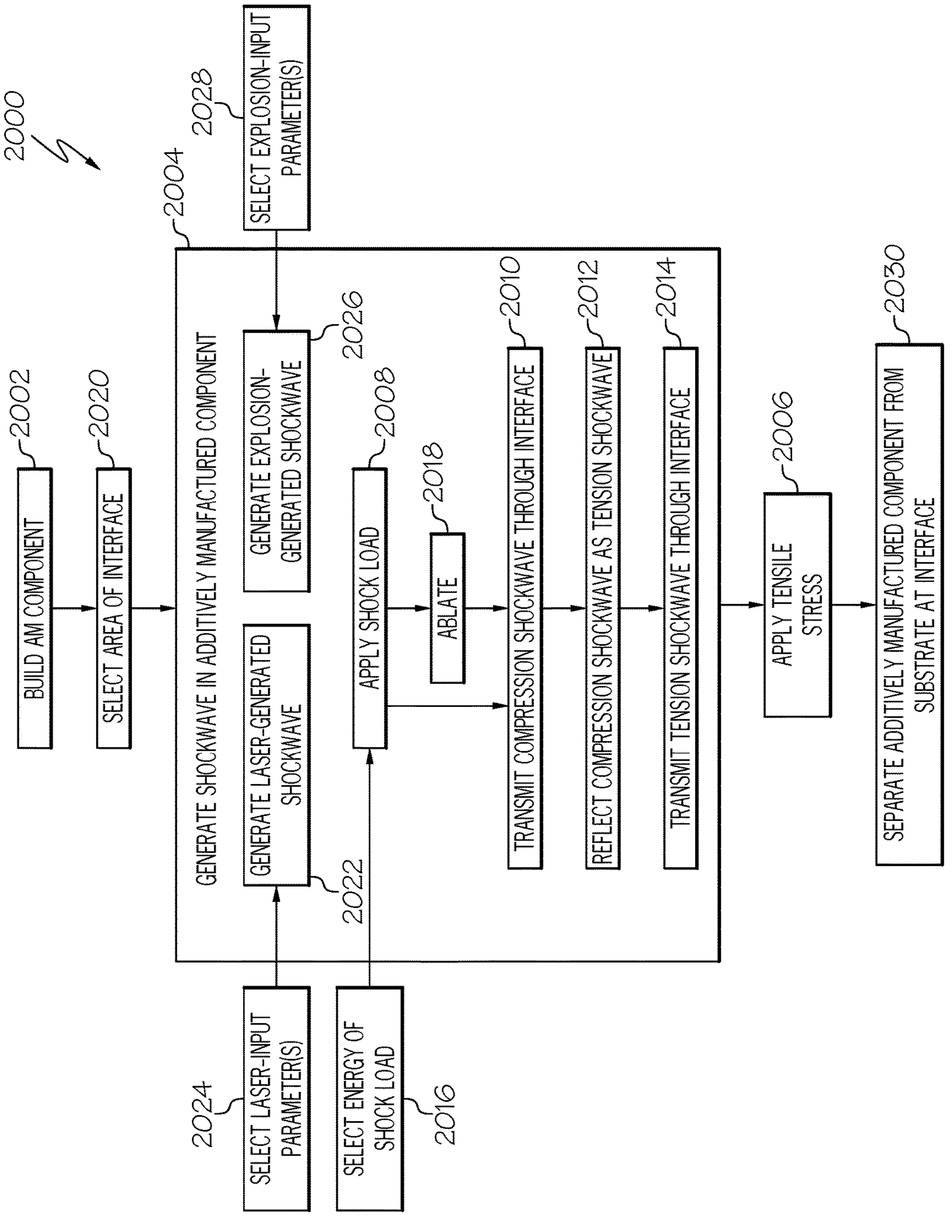
FIG. 2 is a flow diagram of an example of a method for making the additively manufactured component.

Referring to FIGS. 2 and 3, in one or more examples, the method 2000 includes a step of (block 2002) building the additively manufactured component 102 layer-by-layer on the substrate 104. The method 2000 includes a step of (block 2004) generating the shockwave 106. The shockwave 106 can be generated in at least one of the additively manufactured component 102 or the substrate 104. The method 2000 includes a step of (block 2006) applying the tensile stress 110 at the interface 112 between the additively manufactured component 102 and the substrate 104 to separate at least a portion of the additively manufactured component 102 from the substrate 104 along the interface 112 in response to the tensile stress 110.

In other words, the shockwave 106 in the additively manufactured component 102 and/or the substrate 104 results in the tensile stress 110 at the interface 112 between the additively manufactured component 102 and the substrate 104. In one or more examples, the method 2000 includes a step of (block 2030) separating at least a portion of the additively manufactured component 102 from the substrate 104 along the interface 112 in response to the tensile stress 110.

Generally, the step of (block 2002) building the additively manufactured component 102 includes any suitable additive manufacturing technique using any suitable base materials. As examples, the additively manufactured component 102 can be made with metallic materials, polymeric materials, ceramic materials, and the like using powder-based additive manufacturing, extrusion-based additive manufacturing, and the like. In one or more examples, according to the method 2000, the step of (block 2002) building the additively manufactured component 102 includes cold spray additive manufacturing. In one or more examples, according to the method 2000, the step of (block 2002) building the additively manufactured component 102 includes flame spray additive manufacturing. In one or more examples, according to the method 2000, the step of (block 2002) building the additively manufactured component 102 includes binder jetting additive manufacturing. In one or more examples, according to the method 2000, the step of (block 2002) building the additively manufactured component 102 includes directed energy deposition additive manufacturing. In one or more examples, according to the method 2000, the step of (block 2002) building the additively manufactured component 102 includes powder bed fusion additive manufacturing.

Referring to FIGS. 2-7 and 9, in one or more examples, at least a portion of the substrate 104 is planar. As an example, at least a portion of a build surface of the substrate 104 is planar. In these examples the step of (block 2002) building the additively manufactured component 102 includes a step of building the additively manufactured component 102 on the planar portion 156 of the substrate 104.

Referring to FIGS. 2, 3 and 8, in one or more examples, the substrate 104 includes a contour. As an example, at least a portion of a build surface of the substrate 104 is contoured or includes a curvature along at least one axis. In these examples, the step of (block 2002) building the additively manufactured component 102 includes a step of building the additively manufactured component 102 on the contoured portion 158 of the substrate 104.

Referring to FIGS. 2-9, in one more examples, according to the method 2000, the step of (block 2004) generating the shockwave 106 includes a step of (block 2008) applying the shock load 114 to at least one of the additively manufactured component 102 and/or the substrate 104. The step of (block 2004) generating the shockwave 106 includes a step of (block 2010) transmitting the compression shockwave 116 through the interface 112 between the additively manufactured component 102 and the substrate 104. The step of (block 2004) generating the shockwave 106 includes a step of (block 2012) reflecting the compression shockwave 116 as the tension shockwave 118. The step of (block 2004) generating the shockwave 106 includes a step of (block 2014) transmitting the tension shockwave 118 through the interface 112 between the additively manufactured component 102 and the substrate 104. In these examples, the tensile stress 110 is generated and applied in response to the tension shockwave 118. In these examples, according to the method 2000, a portion of the additively manufactured component 102 is separated (e.g., demolded) from the substrate 104 along a portion of the interface 112 in response to the tension shockwave 118.

Referring to FIGS. 2 and 3, in one or more examples, the method 2000 includes a step of (block 2016) selecting the energy 134 of the shock load 114 to produce the magnitude 154 of the tensile stress 110 sufficient to separate the additively manufactured component 102 from the substrate 104 at the interface 112.

Referring to FIGS. 2-4B and 8, in one or more examples, according to the method 2000, the step of (block 2008) applying the shock load 114 includes a step of applying the shock load 114 at the selected location 128 on at least one of the component surface 130 of the additively manufactured component 102 and/or the substrate surface 132 of the substrate 104.

Referring to FIGS. 2-4B and 8, in one or more examples, the method 2000 includes a step of (block 2020) selecting the area 136 of the interface 112 at which to separate the additively manufactured component 102 from the substrate 104. In these examples, the selected location 128 corresponds to the area 136. The tension shockwave 118 passes through the area 136.

In one or more examples, the tension shockwave 118 is perpendicular to the interface 112. In one or more examples, the tension shockwave 118 is non-perpendicular to the interface 112.

Referring to FIGS. 2, 3 and 10, in one or more examples, the method 2000 includes a step of (block 2018) ablating. In one or more examples, the step of (block 2018) ablating includes a step of ablating a portion of the component surface 130 while applying the shock load 114. In one or more examples, the step of (block 2018) ablating includes a step of ablating the ablative material 148 located on portion of the component surface 130 while applying the shock load 114.

Referring to FIGS. 2, 3 and 11, in one or more examples, the shockwave 106 includes the laser-generated shockwave 124. In these examples, the step of (block 2004) generating the shockwave 106 includes a step of (block 2022) generating the laser-generated shockwave 124.

Referring to FIGS. 2, 3 and 11, in one or more examples, according to the method 2000, the step of (block 2004) generating the shockwave 106, such as the step of (block 2022) generating the laser-generated shockwave 124, includes a step of applying the laser pulse 138 to the selected location 128 on at least one of the component surface 130 of the additively manufactured component 102 and/or the substrate surface 132 of the substrate 104.

Referring to FIGS. 2 and 3, in one or more examples, the method 2000 includes a step of (block 2024) selecting at least one laser-input parameter 140 for the laser pulse 138 to produce the magnitude 154 of the tensile stress 110 sufficient to separate the additively manufactured component 102 from the substrate 104 at the area 136 of the interface 112.

Referring to FIGS. 2, 3 and 12, in one or more examples, the shockwave 106 includes the explosion-generated shockwave 126. In these examples, the step of (block 2004) generating the shockwave 106 includes a step of (block 2026) generating the explosion-generated shockwave 126.

Referring to FIGS. 2, 3 and 12, in one or more examples, according to the method 2000, the step of (block 2004) generating the shockwave 106, such as the step of (block

2026) generating the explosion-generated shockwave 126, includes a step of coupling the expendable device 142 to the selected location 128 on at least one of the component surface 130 of the additively manufactured component 102 and/or the substrate surface 132 of the substrate 104 and a step of vaporizing a portion of the expendable device 142.

Referring to FIGS. 2 and 3, in one or more examples, the method 2000 includes a step of (block 2028) selecting at least one explosion-input parameter 144 for the expendable device 142 to produce a magnitude 154 of the tensile stress 110 sufficient to separate the additively manufactured component 102 from the substrate 104 at an area 136 of the interface 112.

Referring to FIGS. 2, 3 and 9, in one or more examples, the method 2000 includes a step of generating a plurality of shockwaves 106 in the additively manufactured component 102 that results in the tensile stress 110 at a plurality of areas 136 along the interface 112 between the additively manufactured component 102 and the substrate 104. The method 2000 also includes a step of separating the additively manufactured component 102 from the substrate 104 along the interface 112.

Referring generally to FIGS. 3-13, by way of examples, the present disclosure is directed to a system 100. The system 100 facilitates demolding the additively manufactured component 102 from the substrate 104. In one or more examples, implementations of the method 1000 are performed using the system 100. In one or more examples, implementations of the method 2000 are performed using the system 100.

Referring to FIG. 3, in one or more examples, the system 100 includes the substrate 104 upon which the additively manufactured component 102 is built. The system 100 also includes a shockwave generator 146. The shockwave generator 146 is configured to generate the shockwave 106 in the additively manufactured component 102 that results in the tensile stress 110 at the interface 112 between the additively manufactured component 102 and the substrate 104. At least a portion of the additively manufactured component 102 separates from the substrate 104 along the interface 112 in response to the tensile stress 110.

Referring to FIGS. 3-7 and 9, in one or more examples, at least a portion of the substrate 104 is planar. As an example, at least a portion of the build surface of the substrate 104 is planar. In these examples, the substrate 104 includes at least the planar portion 156 and at least a portion of the additively manufactured component 102 is built on the planar portion 156 of the substrate 104.

Referring to FIGS. 3 and 8, in one or more examples, at least a portion of the substrate 104 includes a contour. As an example, at least a portion of the build surface of the substrate 104 is contoured or includes a curvature along at least one axis. In these examples, the substrate 104 includes at least the contoured portion 158 and at least a portion of the additively manufactured component 102 is built on the contoured portion 158 of the substrate 104.

Referring to FIGS. 3-7, in one or more examples, the shockwave generator 146 is configured to apply the shock load 114 to at least one of the additively manufactured component 102 and the substrate 104 such that: the compression shockwave 116 is transmitted through the interface 112 between the additively manufactured component 102 and the substrate 104 and is reflecting as the tension shockwave 118; and the tension shockwave 118 is transmitted through the interface 112 between the additively manufactured component 102 and the substrate 104 to apply the tensile stress 110.

Referring to FIG. 3, in one or more examples, the shock load 114 includes the energy 134, which is selected to produce the magnitude 154 of the tensile stress 110 sufficient to separate the additively manufactured component 102 from the substrate 104 at the interface 112.

Referring to FIGS. 3-10, in one or more examples, the substrate 104 includes the substrate surface 132 and a substrate faying surface 122, opposite the substrate surface 132. The additively manufactured component 102 includes the component surface 130 and a component faying surface 120, opposite the component surface 130. The substrate faying surface 122 and the component faying surface 120 form the interface 112. The shock load 114 is applied at the selected location 128 on at least one of the component surface 130 of the additively manufactured component 102 and the substrate surface 132 of the substrate 104.

Referring to FIGS. 3 and 10, in one or more examples, the system 100 includes an ablative material 148. The ablative material 148 includes or takes the form of any suitable sacrificial overlay material that is applied to the surface of the additively manufactured component 102. Generally, the ablative material 148 absorbs the energy of the shock load 114, thereby creating the shockwave 106. In one or more examples, the ablative material 148 is located on a portion of the additively manufactured component 102 that receives the shock load 114. In one or more examples, the ablative material 148 is located on at least a portion of the component surface 130 of the additively manufactured component 102. In one or more examples, the ablative material 148 is an exterior layer of the additively manufactured component 102 and/or forms a portion of the component surface 130 of the additively manufactured component 102. In one or more examples, the ablative material 148 is utilized in examples where the shock load 114 is delivered by the laser beam 152 and the shockwave 106 is the laser-generated shockwave 124. However, in other examples, the shock load 114 is delivered by the laser beam 152 and the shockwave 106 is the laser-generated shockwave 124 without ablation or utilization of the ablative material 148.

Referring to FIGS. 3, 10 and 11, in one or more examples, the shockwave generator 146 includes or takes the form of a laser 150. In these examples, the shockwave 106 is the laser-generated shockwave 124 and is generated by applying the laser beam 152 to at least one of the additively manufactured component 102 and/or the substrate 104.

Referring to FIG. 3, in one or more examples, the laser 150 includes a plurality of laser-input parameters 140. At least one of the laser-input parameters 140 is selected to produce the magnitude 154 of the tensile stress 110 sufficient to separate the additively manufactured component 102 from the substrate 104 at the area 136 of the interface 112. Generally, the laser energy, power lever, beam diameter (e.g., spot size), and wavelength are tuned at desired levels to break the bonds at the interface 112 and cause demolding.

Referring to FIG. 11, in one or more examples, the laser 150 includes any suitable laser exciter that is configured to apply the shock load 114 to cause demolding at the interface 112. Specifically, the laser 150 is configured to generate and apply the laser beam 152 at the selected location 128 on the surface of at least one of the additively manufactured component 102 and/or the substrate 104. In one or more examples, when the system 100 is in operation, laser energy is directed at the component surface 130 of the additively manufactured component 102, which generates the compression shockwave 116. The compression shockwave 116 is propagated to substrate surface 132 of the substrate 104 and applies a compressive stress 108 (FIG. 3) to the interface

112. The compression shockwave 116 is reflected to form the tension shockwave 118 that moves toward the component surface 130 of the additively manufactured component 102. The tension shockwave 118 produces the tensile stress 110 (FIG. 3) at the interface 112 and thereby causes demolding substantially within the area 136. The laser 150 can subsequently be repositioned one or more times to deliver the laser energy at additional ones of the selected location 128 on the surface of the additively manufactured component 102 and/or the substrate 104 to demold other ones of the area 136.

Referring to FIG. 10, in one or more examples, the additively manufactured component 102 includes a layer of the ablative material 148 located on the component surface 130. The shock load 114 is delivered by the laser beam 152. The energy of the laser beam 152 is absorbed in the ablative material 148. Vaporization of a portion of the ablative material 148 produces a rapidly expanding plasma to create the compression shockwave 116 that travels through the interface 112 and reflects off of the substrate surface 132 behind the interface 112. After reflection, the energy passes back through the interface 112 as the tension shockwave 118 and stresses it, breaking the bond between the additively manufactured component 102 and the substrate 104.

In other examples, the ablative material 148 is located on a portion of the substrate 104 that receives the shock load 114. In one or more examples, the ablative material 148 is located on at least a portion of the substrate surface 132 of the additively manufactured component 102. In these examples, the compression shockwave 116 travels through the interface 112 and reflects off of the component surface 130 behind the interface 112. After reflection, the energy passes back through the interface 112 as the tension shockwave 118 and stresses it, breaking the bond between the additively manufactured component 102 and the substrate 104.

Referring to FIGS. 3 and 12, in one or more examples, the shockwave generator 146 includes or takes the form of an expendable device 142. The expendable device 142 is coupled to the selected location 128 on at least one of the additively manufactured component 102 and the substrate 104. In these examples, the shockwave 106 is the explosion-generated shockwave 126 and is generated by vaporizing a portion of the expendable device 142.

Referring to FIG. 3, in one or more examples, the expendable device 142 includes a plurality of explosion-input parameters 144. At least one of the explosion-input parameters 144 is selected to produce the magnitude 154 of the tensile stress 110 sufficient to separate the additively manufactured component 102 from the substrate 104 at the area 136 of the interface 112.

Referring to FIG. 12, in one or more examples, the shockwave demolding method includes an exploding wire method that generates plasma by sending a strong pulse of electric current through a thin wire of an electrically conductive material. Resistive heating vaporized the wire, and an electric arc through that vaporization creates an explosive shockwave (e.g., the explosion-generated shockwave 126). In these examples, the expendable device 142 includes or takes the form of exploding bridge wires 168, also referred to as an exploding bridgewire detonator or exploding wire detonator. In one or more examples, the expendable device 142 includes an arrangement of exploding bridge wires 168, such as a patterned planar array of the exploding bridge wires 168. The structure of the expendable device 142 includes any structure capable of positioning an array of the exploding bridge wires 168 in a coupling relationship with the component surface 130 of the additively manufactured component 102 (e.g., as shown in FIG. 12) or the substrate surface 132 of the substrate 104, such that the compression shockwave 116 formed by vaporization of the exploding bridge wires 168 is transmitted into the additively manufactured component 102 or the substrate 104. The arrangement or array of the exploding bridge wires 168 react to single applied pulse of electrical energy by simultaneously vaporizing and creating the compression shockwave 116. By coupling the expendable device 142 to the surface of the additively manufactured component 102, the compression shockwave 116 generated by the exploding bridge wires 168 propagates from the component surface 130 of the additively manufactured component 102 and through the interface 112 to the substrate surface 132 so that the compression shockwave 116 reflects from the substrate surface 132 as the tension shockwave 118, which applies the tensile stress 110 (FIG. 3) to the area 136 of the interface 112 to be demolded. By controlling the size and amount of exploding bridge wires 168 in the arrangement (e.g., patterned planar array) of the exploding bridge wires 168 and the amount of electrical energy applied to the exploding bridge wires 168, the system 100 facilitates precise control of the energy of the resulting shockwave 106. In one or more examples, a pulsed-power unit 170 applies a pulse of electrical energy to the exploding bridge wires 168 in the expendable device 142. The pulsed-power unit 170 can control characteristics of a resulting shockwave 106 by adjusting the characteristics of the pulse of electrical energy applied from the pulsed-power unit 170.

Figure 13:
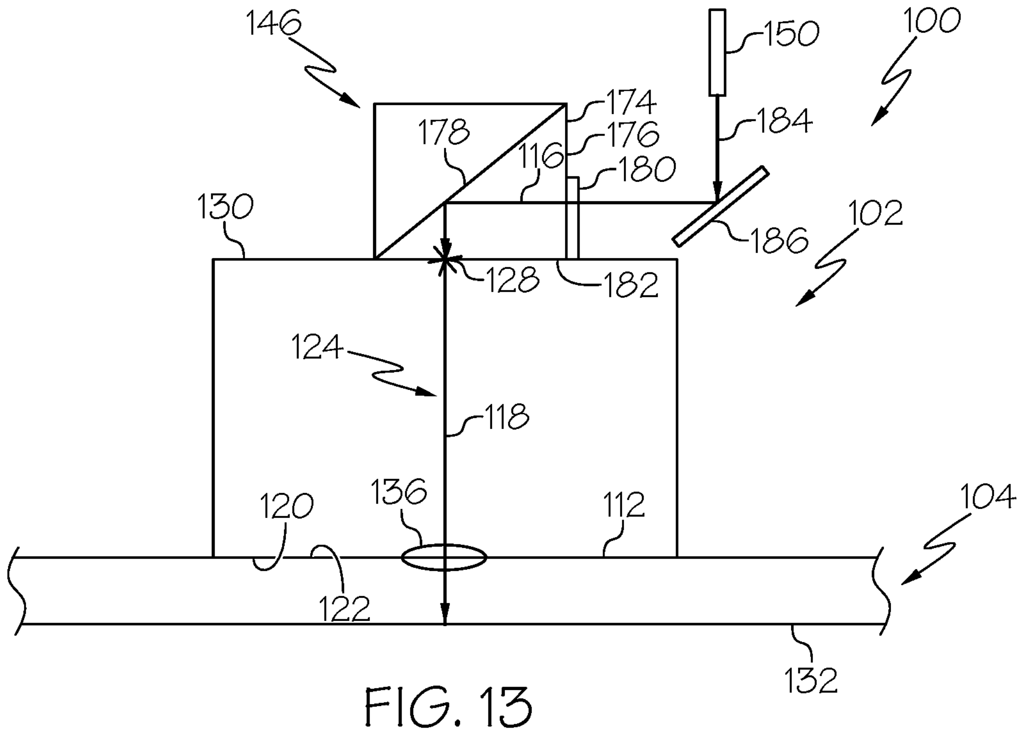
FIG. 13 is a schematic illustration of an example of a portion of the system illustrated in FIG. 3.

Referring to FIGS. 3 and 13, in one or more examples, the shockwave generator 146 includes or takes the form of a transducer structure 174. The transducer structure 174 is configured to generate and transmit the shockwave 106. In one or more examples, the transducer structure 174 is configured to generate and transmit the laser-generated shockwave 124 in response to the laser pulse 138. An absorber surface 176 on the transducer structure 174 is configured to receive energy and is configured to cause the compression shockwave 116. A reflecting surface 178 on the transducer structure 174 is configured to reflect the compression shockwave 116 traveling from the absorber surface 176 to generate the tension shockwave 118 in a desired direction using a configuration of the reflecting surface 178 in which the compression shockwave 116 is generated by an absorber 180 that is coupled to the absorber surface 176 and that absorbs the energy from a beam of coherent light (e.g., the laser beam 152). A coupling surface 182 on the transducer structure 174 is configured to be coupled to the component surface 130 of the additively manufactured component 102 and/or to the substrate surface 132 of the substrate 104, such that the tension shockwave 118 travels through the interface 112 in the desired direction. In one or more examples, the laser 150 is configured to generate the beam of coherent light (e.g., the laser beam 152).

Referring to FIG. 13, in one or more examples, the laser 150 is configured to generate beam of coherent light 184 and send the beam of coherent light 184 toward a reflector 186 in the direction shown for the beam of coherent light 184. In one or more examples, the beam of coherent light 184 takes the form of the laser beam 152 (FIG. 3). In these examples, the laser beam 152 can be generated as a pulse. The pulse can have different durations. As an example, the pulse can be about 300 nanoseconds or less in duration. In one or more examples, the reflector 186 is configured to direct the beam of coherent light 184, generated by laser 150, toward the absorber surface 176 on the transducer structure 174. In one or more examples, the reflector 186 includes or takes the form of a mirror. In other examples, additional mirrors or other components may be part of the reflector 186. In one or more examples, the absorber 180 is connected to the absorber surface 176. The absorber 180 is configured to absorb the coherent light in beam of coherent light 184 and generate the compression shockwave 116 inside of transducer structure 174. In one or more examples, when the absorber 180 absorbs coherent light in the beam of coherent light 184, the absorber 180 heats and forms a plasma. The plasma causes the compression shockwave 116 to be generated. The transducer structure 174 is configured to create the tension shockwave 118 from the compression shockwave 116 and direct the tension shockwave 118 through interface 112. When the compression shockwave 116 reaches the reflecting surface 178, the compression shockwave 116 is reflected by the reflecting surface 178 to generate the tension shockwave 118. In one or more examples, the tension shockwave 118 is generated as a result of an interface between dissimilar media. As an example, the interface at the reflecting surface 178 is an interface between the material forming the transducer structure 174 and air. In one or more examples, the reflecting surface 178 may be a hypotenuse for the transducer structure 174. In one or more examples, the material in the transducer structure 174 has a higher acoustic impedance as compared to air. This difference in acoustic impedance causes the compression shockwave 116 to be converted into the tension shockwave 118. In other examples, another medium other than air can be used. If another medium is selected, that medium is selected to have a lower acoustic impedance as compared to the material in the transducer structure 174. The tension shockwave 118 travels through the interface 112 in a desired direction to demold the additively manufactured component 102 along the interface 112. In one or more examples, a shape, focus, and other characteristics of the tension shockwave 118 can be controlled based on the configuration of the reflecting surface 178. In one or more examples, the tension shockwave 118 is a shockwave that causes the tensile stress 110 within interface 112 through which the tension shockwave 118 propagates. In one or more examples, the transducer structure 174 has a prism shape. In one or more examples, the transducer structure 174 takes the form of a prism. The transducer structure 174 is made of one or more materials that provide a desired level of strength of sound waves, a desired propagation of sound waves, or a combination of the two. In other words, the number of materials selected for the transducer structure 174 can be selected such that the materials provide a low enough loss when sound waves propagate through those materials. Material selected for the transducer structure 174 also may be selected to have a desired level of density and weight.

Referring to FIGS. 3 and 9, in one or more examples, the system 100 includes a plurality of shockwave generators 146 configured to generate a plurality of shockwaves 106 in the additively manufactured component 102 that results in the tensile stress 110 at a plurality of areas 136 along the interface 112 between the additively manufactured component 102 and the substrate 104. For example, each one of the plurality of shockwave generators 146 includes one of the laser 150, the expendable device 142, and/or the transducer structure 174.

In one or more examples, the system 100 includes at least a first shockwave generator **146*a* and a second shockwave generator 146*b*. The first shockwave generator 146*a* is used to deliver a first shock load 114*a* that results in a first shockwave 106*a*. The second shockwave generator 146*b* is used to deliver a second shock load 114*b* that results in a second shockwave 106*b* from another direction relative to the interface 112 and in cooperation with the first shockwave 106*a* to demold the additively manufactured component 102. In one or more examples, the first shock load 114*a* and second shock load 114*b* can be delivered consecutively or essentially simultaneously, and the resulting first shockwave 106*a* and second shockwave 106*b* (e.g., first compression shockwave 116*a* and second compression shockwave 116*b*, and first tension shockwave 118*a* and second tension shockwave 118*b*) can intersect and pass through the area 136 of the interface 112 consecutively or essentially simultaneously. Thus, by appropriate timing of the shock load 114, the tensile stress 110 from the tension shockwaves 118 can be optimized relative to depth of the interface 112 to achieve the desired demolding at a desired location along the interface 112**.

Figure 5:
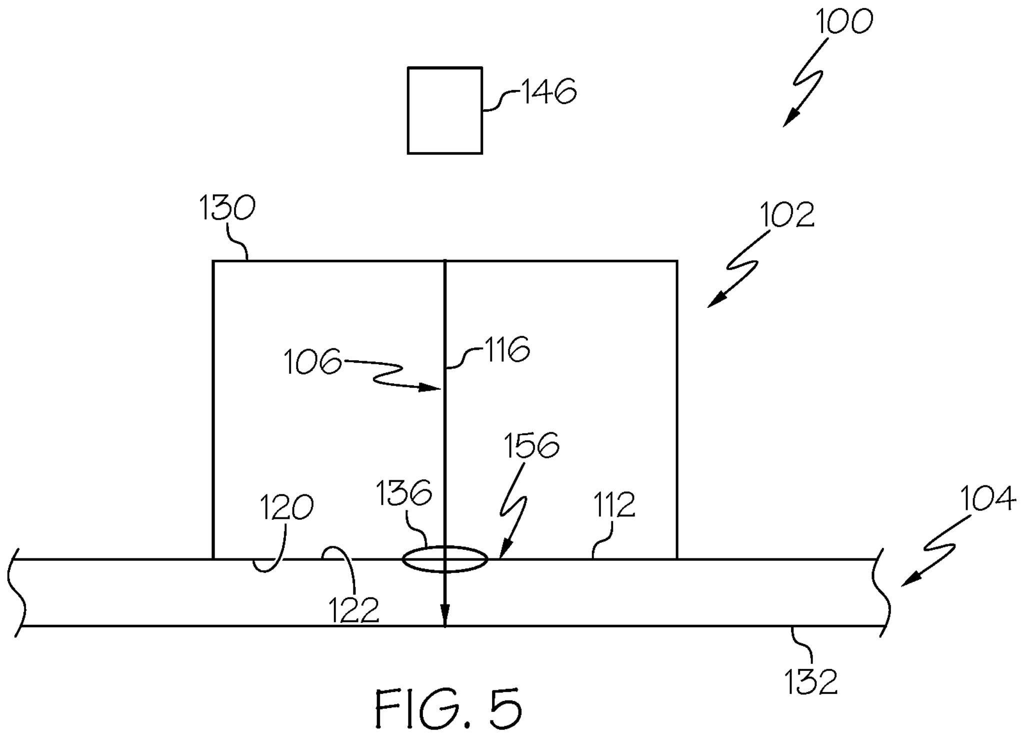
FIG. 5 is a schematic illustration of an example of a portion of the system illustrated in FIG. 4A, depicting the additively manufactured component and the substrate relative to compression shockwave.
Figure 6:
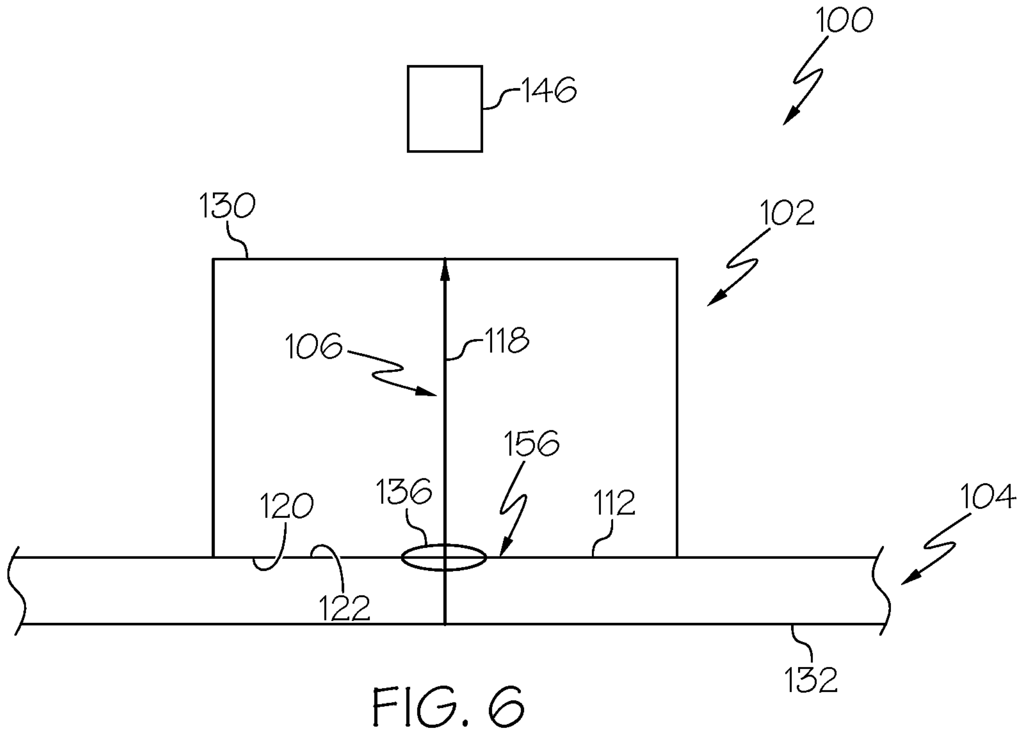
FIG. 6 is a schematic illustration of an example of a portion of the system illustrated in FIG. 4A depicting the additively manufactured component and the substrate relative to a tension shockwave.

FIGS. 4A-7 illustrate various stages of the demolding process exemplified by the method 1000 and/or the method 2000 and/or performed by the system 100. As illustrated in FIGS. 4A and 4B, the shock load 114 is directed at the selected location 128 on at least one of the additively manufactured component 102 and/or the substrate 104. As illustrated in FIG. 5, the shock load 114 creates the compression shockwave 116. The compression shockwave 116 is propagated through the interface 112 to and applies a compressive stress 108 (FIG. 3) to the interface 112. As illustrated in FIG. 6, the compression shockwave 116 is reflected from a surface behind the interface 112 to form the tension shockwave 118 that moves through the interface 112. The tension shockwave 118 produces the tensile stress 110 (FIG. 3) at the interface 112 and thereby causes demolding of the additively manufactured component 102 substantially within the area 136 along the interface 112.

Figure 7:
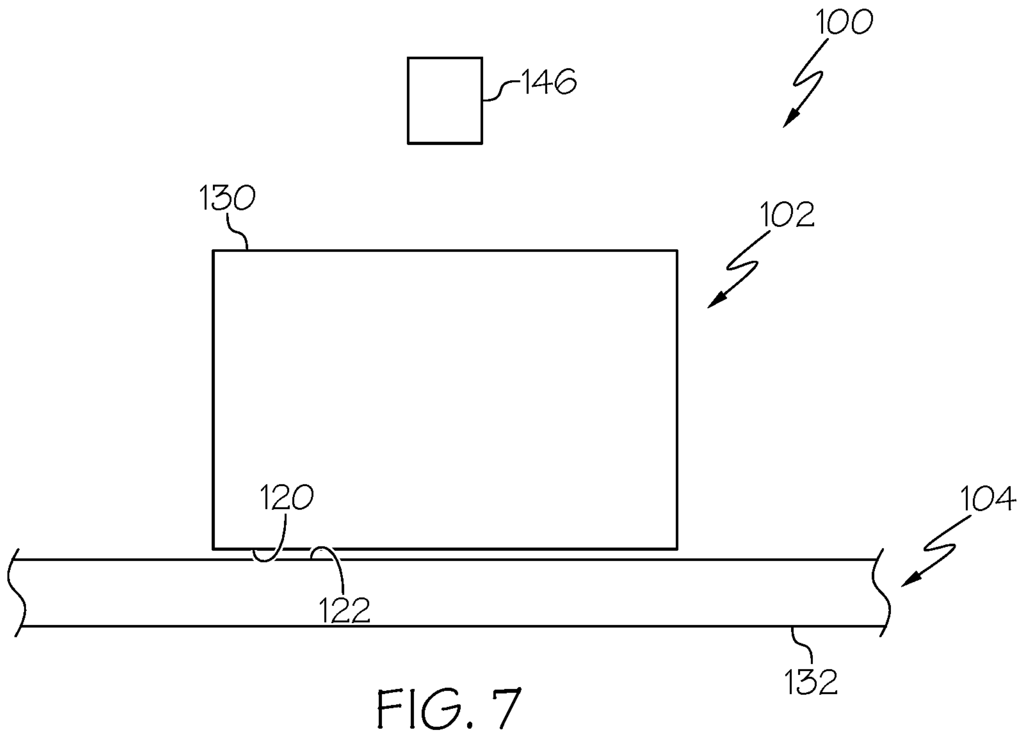
FIG. 7 is a schematic illustration of an example of a portion of the system illustrated in FIG. 4A, depicting the additively manufactured component separated from the substrate along an interface.

The shockwave generator 146 can subsequently be repositioned one or more times to deliver the shock load 114 at additional ones of the selected location 128 on the surface of the additively manufactured component 102 and/or the substrate 104 to demold other ones of the area 136. In such a manner, the shockwave demolding can be propagated along the interface 112. Demolding can be propagated continuously. When demolding is completed, the additively manufactured component 102 can be removed from the substrate 104 without deterioration of the additively manufactured component 102, as illustrated in FIG. 7.

Referring again to FIG. 3, in one or more examples, the system 100 includes a controller 160. The controller 160 is adapted or configured to execute instructions and to provide operational commands to components of the system 100, such as the shockwave generator 146. As an example, the shockwave generator 146 is activated and operates under direction of the controller 160. In one or more examples, the controller 160 is programmed with instructions (e.g., in the form of program code 166) that, when executed by the controller 160, causes the controller 160 to perform operations. In one or more examples, the controller 160 includes or takes the form of a computing device (e.g., one or more computers). In these examples, the method 1000 and the method 2000 are computer-implemented methods.

In one or more examples, the controller 160 includes or takes the form of a data processing system. In one or more examples, the data processing system of the controller 160 includes a communications framework, which provides communications between at least one processor 162 and memory 164 (e.g., one or more storage devices). The processor 162 serves to execute instructions for software that can be loaded into the memory 164. In one or more examples, the processor 162 is a number of processor units, a multi-processor core, or some other type of processor, depending on the particular implementation. The memory 164 is an example of a storage device or any piece of hardware that is capable of storing information, such as, for example, without limitation, at least one of data, program code in functional form, or other suitable information either on a temporary basis, a permanent basis, or both on a temporary basis and a permanent basis. The memory 164 may also be referred to as computer readable storage devices in one or more examples. The memory 164 is, for example, a random-access memory or any other suitable volatile or non-volatile storage device. Instructions for at least one of the operating system, applications, or programs can be located in the memory 164, which is in communication with the processor 162. The processes of the various examples and operations described herein can be performed by the processor 162 using computer-implemented instructions, which can be located in a memory, such as the memory 164. The instructions are also referred to as program code 166, computer usable program code, or computer readable program code that can be read and executed by the processor 162. The program code 166 in the different examples can be embodied on different physical or computer readable storage media, such as the memory 164. In one or more examples, the program code 166 is located in a functional form on computer readable media that is selectively removable and can be loaded onto or transferred to the data processing system for execution by the processor 162. In one or more examples, the program code and computer readable media form a computer program product. Additionally, various components of the controller 160 and/or the data processing system may be described as modules. For the purpose of the present disclosure, the term "module" includes hardware, software or a combination of hardware and software. As an example, a module can include one or more circuits configured to perform or execute the described functions or operations of the executed processes described herein. As another example, a module includes a processor, a storage device (e.g., a memory), and computer-readable storage medium having instructions that, when executed by the processor causes the processor to perform or execute the described functions and operations. In one or more examples, a module takes the form of program code and computer readable media, together forming a computer program product.

In one or more examples, the system 100 is implemented using software, hardware, firmware, or a combination thereof. When software is used, the operations performed by the system 100 are implemented using, for example, without limitation, the program code 166 configured to run on the processor 162. When firmware is used, the operations performed by the system 100 may be implemented using, for example, without limitation, the program code 166 and data stored in the memory 164 to run on the processor 162. When hardware is employed, the hardware may include one or more circuits that operate to perform the operations performed by the system 100. Depending on the implementation, the hardware may take the form of a circuit system, an integrated circuit, an application specific integrated circuit (ASIC), a programmable logic device, or some other suitable type of hardware device configured to perform any number of operations. A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

Referring still to FIG. 3, in one or more examples, the system 100 includes an additive manufacturing apparatus 172. The additive manufacturing apparatus 172 is configured to build the additively manufactured component 102 on the substrate 104. The additive manufacturing apparatus 172 includes any suitable type of additive manufacturing machines with associated components.

Figure 14:
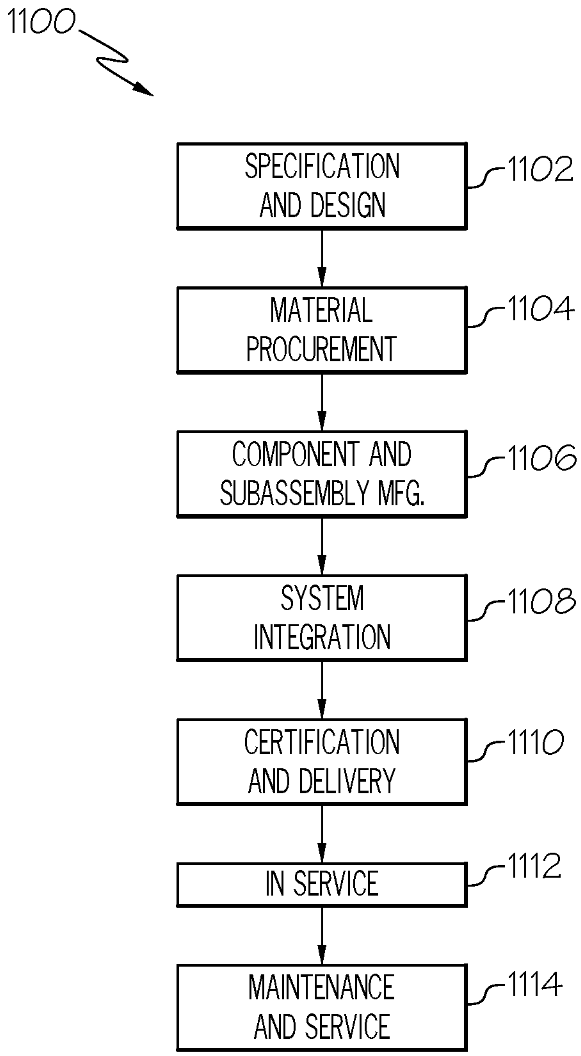
FIG. 14 is a flow diagram of an example of an aircraft manufacturing and service method.
Figure 15:
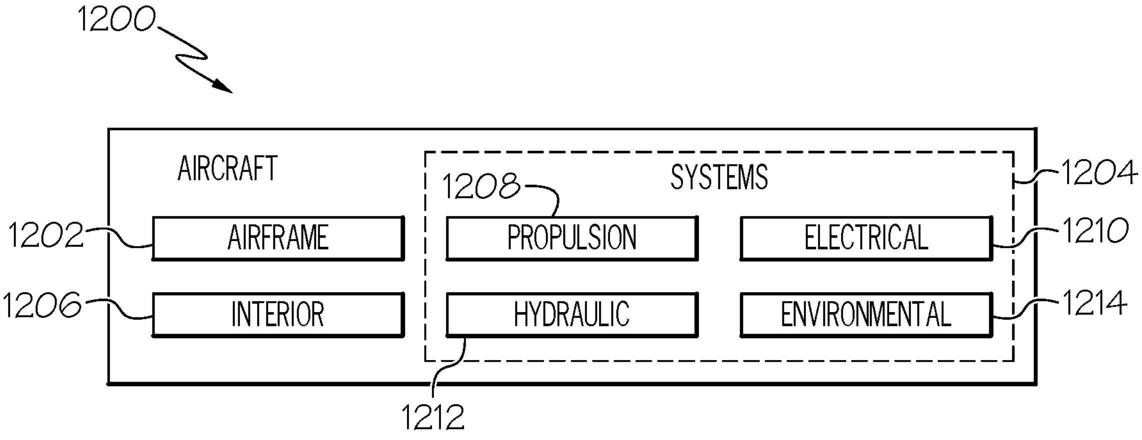
FIG. 15 is a schematic block diagram of an example of an aircraft.

Referring now to FIGS. 14 and 15, examples of the system 100, the method 1000, and the method 2000 described herein, may be related to, or used in the context of, an aircraft manufacturing and service method 1100, as shown in the flow diagram of FIG. 14 and an aircraft 1200, as schematically illustrated in FIG. 15. For example, the aircraft 1200 and/or the aircraft production and service method 1100 may include the additively manufactured component 102 that is fabricated and demolded using the system 100 and/or according to the method 1000 and the method 2000.

Referring to FIG. 15, which illustrates an example of the aircraft 1200. The aircraft 1200 includes an airframe 1202 having an interior 1206. The aircraft 1200 includes a plurality of onboard systems 1204 (e.g., high-level systems). Examples of the onboard systems 1204 of the aircraft 1200 include propulsion systems 1208, hydraulic systems 1212, electrical systems 1210, and environmental systems 1214. In other examples, the onboard systems 1204 also includes one or more control systems coupled to an airframe 1202 of the aircraft 1200, such as for example, flaps, spoilers, ailerons, slats, rudders, elevators, and trim tabs. In yet other examples, the onboard systems 1204 also includes one or more other systems, such as, but not limited to, communications systems, avionics systems, software distribution systems, network communications systems, passenger information/entertainment systems, guidance systems, radar systems, weapons systems, and the like. The aircraft 1200 may include various other structures made using the additively manufactured component 102 that is made and demolded using the system 100 and/or according to the method 1000 and the method 2000.

Referring to FIG. 14, during pre-production of the aircraft 1200, the manufacturing and service method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the manufacturing and service method 1100 illustrated in FIG. 14 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the system 100, the method 1000, and the method 2000 shown and described herein, may be employed during any one or more of the stages of the manufacturing and service method 1100 shown in the flow diagram illustrated by FIG. 14. In an example, making and demolding the additively manufactured component 102 using the system 100 and/or according to the method 1000 and the method 2000 may form a portion of component and subassembly manufacturing (block 1106) and/or system integration (block 1108). Further, additively manufactured components 102 made and demolded using the system 100 and/or according to the method 1000 and the method 2000 may be implemented in a manner similar to components or subassemblies prepared while the aircraft 1200 is in service (block 1112). Also, additively manufactured components 102 made and demolded using the system 100 and/or according to the method 1000 and the method 2000 may be utilized during system integration (block 1108) and certification and delivery (block 1110). Similarly, additively manufactured components 102 made and demolded using the system 100 and/or according to the method 1000 and the method 2000 may be utilized, for example and without limitation, while the aircraft 1200 is in service (block 1112) and during maintenance and service (block 1114).

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components, or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of," when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 3-13 and 15, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 3-13 and 15, referred to above, need be included in every example and not all elements, features, and/or components described herein are necessarily depicted in each illustrative example. Accordingly, some of the elements, features, and/or components described and illustrated in FIGS. 3-13 and 15 may be combined in various ways without the need to include other features described and illustrated in FIGS. 3-13 and 15, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 3-13 and 15, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 3-13 and 15, and such elements, features, and/or components may not be discussed in detail herein with reference to each of FIGS. 3-13 and 15. Similarly, all elements, features, and/or components may not be labeled in each of FIGS. 3-13 and 15, but reference numerals associated therewith may be utilized herein for consistency.

In FIGS. 1, 2 and 14, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 1, 2 and 14 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the system 100, the method 1000, and the method 200 have been shown and described, modifications may occur to those skilled in the art upon reading the specification. The present application includes such modifications and is limited only by the scope of the claims.

What is claimed is:

1. A method for demolding an additively manufactured component, the method comprising steps of:

selecting an area of an interface between a component faying surface of the additively manufactured component and a substrate faying surface of the substrate upon which the additively manufactured component is built for separation of the additively manufactured component from the substrate;

selecting an energy of a shock load to produce a magnitude of a tensile stress sufficient to separate the additively manufactured component from the substrate at the area of the interface;

generating a shockwave in at least one of the additively manufactured component or the substrate by applying the shock load to at least one of the additively manufactured component or the substrate such that the shockwave passes through at least a portion of the area of the interface; and applying the tensile stress at at least the portion of the area of the interface to separate at least a portion of the component faying surface of the additively manufactured component from the substrate faying surface of the substrate along the interface in response to the shockwave passing through the area of the interface.

2. The method of claim 1, wherein:

the step of generating the shockwave comprises:

transmitting a compression shockwave through the interface between the additively manufactured component and the substrate;

reflecting the compression shockwave as a tension shockwave; and transmitting the tension shockwave through the interface between the additively manufactured component and the substrate; and a portion of the additively manufactured component is separated from the substrate along a portion of the interface in response to the tension shockwave.

3. The method of claim 1, further comprising ablating an ablative material located on portion of a component surface while applying the shock load.

4. The method of claim 1, wherein the step of generating a shockwave comprises generating a laser-generated shockwave.

5. The method of claim 1, wherein the step of generating a shockwave comprises a step of generating an explosion-generated shockwave.

6. A method for making an additively manufactured component, the method comprising steps of:

building the additively manufactured component layer-by-layer on a substrate;

selecting an area of an interface between a component faying surface of the additively manufactured component or a substrate faying surface of the substrate for separation of the additively manufactured component from the substrate;

selecting an energy of a shock load to produce a magnitude of a tensile stress sufficient to separate the additively manufactured component from the substrate at the area of the interface;

generating a shockwave in at least one of the additively manufactured component or the substrate by applying the shock load to at least one of the additively manufactured component or the substrate such that the shockwave passes through the area of the interface; and applying the tensile stress at the area of the interface between the additively manufactured component and the substrate to separate at least a portion of the additively manufactured component from the substrate along at least a portion of the area of the interface in response to the shockwave passing through the area of the interface.

7. The method of claim 6, wherein the step of building the additively manufactured component comprises one of cold spray additive manufacturing or flame spray additive manufacturing, binder jetting additive manufacturing, directed energy deposition additive manufacturing.

8. The method of claim 6, wherein the step of building the additively manufactured component comprises building the additively manufactured component on a planar portion of the substrate.

9. The method of claim 6, wherein building the additively manufactured component comprises building the additively manufactured component on a contoured portion of the substrate.

10. The method of claim 6, wherein:

the step of generating the shockwave comprises:

transmitting a compression shockwave through the interface between the additively manufactured component and the substrate;

reflecting the compression shockwave as a tension shockwave; and transmitting the tension shockwave through the interface between the additively manufactured component and the substrate; and a portion of the additively manufactured component is separated from the substrate along a portion of the interface in response to the tension shockwave.

11. The method of claim 6, wherein the step of generating a shockwave comprises generating a laser-generated shockwave.

12. The method of claim 6, wherein the step of generating a shockwave comprises generating an explosion-generated shockwave.

13. A system for demolding, the system comprising:

a substrate comprising a substrate faying surface upon which an additively manufactured component is built;

a controller programmed to:

determine an area of an interface between a component faying surface of the additively manufactured component and the substrate faying surface of the substrate for separation of the additively manufactured component from the substrate; and determine an energy of a shock load to produce a magnitude of a tensile stress sufficient to separate the additively manufactured component from the substrate at the area of the interface; and a shockwave generator configured to generate a shockwave in at least one of the additively manufactured component or the substrate by applying the shock load to at least one of the additively manufactured component or the substrate such that the shockwave passes through at least a portion of the area of the interface and results in the tensile stress at at least the portion of the area of the interface between the additively manufactured component and the substrate, wherein at least a portion of the additively manufactured component separates from the substrate along the interface in response to the tensile stress.

14. The system of claim 13, wherein the substrate is planar.

15. The system of claim 13, wherein the substrate comprises a contour.

16. The system of claim 13, wherein:

the shockwave generator is configured to apply the shock load to at least one of the additively manufactured component or the substrate such that:

a compression shockwave is transmitted through the interface between the additively manufactured component and the substrate and is reflecting as a tension shockwave; and the tension shockwave is transmitted through the interface between the additively manufactured component and the substrate to apply the tensile stress;

the shock load comprises the energy selected to produce the magnitude of the tensile stress sufficient to separate the additively manufactured component from the substrate at the interface;

the substrate faying surface and a component faying surface form the interface; and the shock load is applied at a selected location on one of a component surface of the additively manufactured component or a substrate surface of the substrate.

17. The system of claim 16, further comprising an ablative material located on at least a portion of the component surface of the additively manufactured component.

18. The method of claim 6, wherein the step of building the additively manufactured component comprises binder jetting additive manufacturing.

19. The method of claim 6, wherein the step of building the additively manufactured component comprises directed energy deposition additive manufacturing.

20. The method of claim 6, wherein the step of building the additively manufactured component comprises powder bed fusion additive manufacturing.

* * * * *